(12) United States Patent
Choi et al.

(10) Patent No.: US 12,007,894 B2
(45) Date of Patent: Jun. 11, 2024

(54) BATTERY MANAGEMENT APPARATUS AND METHOD

(71) Applicant: LG ENERGY SOLUTION, LTD., Seoul (KR)

(72) Inventors: Jae-Yeon Choi, Daejeon (KR); Jong-Shik Baek, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/420,046

(22) PCT Filed: Sep. 17, 2020

(86) PCT No.: PCT/KR2020/012583
§ 371 (c)(1),
(2) Date: Jun. 30, 2021

(87) PCT Pub. No.: WO2021/054749
PCT Pub. Date: Mar. 25, 2021

(65) Prior Publication Data
US 2022/0091982 A1 Mar. 24, 2022

(30) Foreign Application Priority Data
Sep. 20, 2019 (KR) .......................... 10-2019-0116253

(51) Int. Cl.
*G06F 12/0815* (2016.01)
*G06F 12/0808* (2016.01)
(Continued)

(52) U.S. Cl.
CPC ...... *G06F 12/0815* (2013.01); *G06F 12/0808* (2013.01); *G06F 12/084* (2013.01);
(Continued)

(58) Field of Classification Search
CPC ............. G06F 12/0815; G06F 12/0808; G06F 12/084; G06F 12/1433; G06F 2212/1032; H02J 7/005
See application file for complete search history.

(56) References Cited

U.S. PATENT DOCUMENTS 6,519,685 B1 * 2/2003 Chang ................. G06F 12/0831
711/120
2005/0021914 A1 1/2005 Chung
(Continued)

FOREIGN PATENT DOCUMENTS

| CN | 102483840 A | 5/2012 |
|---|---|---|
| CN | 105264501 A | 1/2016 |

(Continued)

OTHER PUBLICATIONS

International Search Report issued in corresponding International Patent Application No. PCT/KR2020/012583, dated Dec. 3, 2020.
(Continued)

*Primary Examiner* — Gurtej Bansal
(74) *Attorney, Agent, or Firm* — Morgan, Lewis & Bockius LLP (57) ABSTRACT

A battery management apparatus according to an embodiment of the present disclosure includes a processor including a plurality of cores respectively provided with a cache memory and configured to set a core storing a record-target data in the cache memory thereof among the plurality of cores as a main core and set a core other than the main core among the plurality of cores as a sub core; and a main memory configured to store the record-target data by the main core, wherein the main core is configured to block an authority of the sub core to access the main memory while the record-target data is being recorded in the main memory, and endow an authority to access the main memory to the
(Continued)

sub core after the record-target data is recorded in the main memory.

17 Claims, 5 Drawing Sheets

(51) Int. Cl.
    *G06F 12/084*     (2016.01)
    *G06F 12/14*     (2006.01)
    *H02J 7/00*     (2006.01)

(52) U.S. Cl.
    CPC ........ *G06F 12/1433* (2013.01); *H02J 7/0048* (2020.01); *H02J 7/005* (2020.01); *G06F 2212/1032* (2013.01)

(56) References Cited

U.S. PATENT DOCUMENTS

| | | | |
|---|---|---|---|
| 2006/0224834 A1 | 10/2006 | O'Connor et al. | |
| 2008/0177955 A1* | 7/2008 | Su | G06F 9/526 711/E12.001 |
| 2008/0320236 A1 | 12/2008 | Jeda et al. | |
| 2009/0013118 A1* | 1/2009 | Clark | G06F 13/24 710/265 |
| 2011/0047333 A1 | 2/2011 | Wolfe et al. | |
| 2012/0042133 A1 | 2/2012 | Takeda et al. | |
| 2012/0324167 A1 | 12/2012 | Yokosawa | |
| 2013/0138850 A1 | 5/2013 | Yamashita et al. | |
| 2013/0185511 A1 | 7/2013 | Sassone et al. | |
| 2013/0198541 A1 | 8/2013 | Rabii | |
| 2014/0040563 A1 | 2/2014 | Lee et al. | |
| 2014/0089593 A1 | 3/2014 | Vera et al. | |
| 2014/0143469 A1* | 5/2014 | Tran | G06F 13/24 710/268 |
| 2015/0242322 A1 | 8/2015 | Vajapeyam | |
| 2016/0328326 A1 | 11/2016 | Di Blas et al. | |
| 2016/0350018 A1* | 12/2016 | Tsirkin | G06F 12/109 |
| 2017/0199248 A1* | 7/2017 | Lee | G01R 31/3646 |
| 2020/0033420 A1 | 1/2020 | Kim | |

FOREIGN PATENT DOCUMENTS

| | | |
|---|---|---|
| CN | 108664325 B | 6/2019 |
| EP | 0341670 B1 | 7/1996 |
| JP | H04-127260 A | 4/1992 |
| JP | 2003-30042 A | 1/2003 |
| JP | 2005-44342 A | 2/2005 |
| JP | 2008-225906 A | 9/2008 |
| JP | 2013-3793 A | 1/2013 |
| JP | 2016-118818 A | 6/2016 |
| JP | 2018-13843 A | 1/2018 |
| KR | 10-2005-0011152 A | 1/2005 |
| KR | 2012-38236 A | 2/2012 |
| KR | 10-1355105 B1 | 1/2014 |
| KR | 10-2014-0124794 A | 10/2014 |
| WO | WO2012014285 A1 | 2/2012 |
| WO | 2013/101123 A1 | 7/2013 |
| WO | 2019/088746 A1 | 5/2019 |

OTHER PUBLICATIONS

Extended European Search Report dated Apr. 20, 2022 issued by the European Patent Office in corresponding European Patent Application No. 20866055.5.

Office Action dated Jul. 19, 2022 issued by the Japanese Patent Office in a corresponding Japanese Patent Application No. 2021-534594.

Office Action, dated Aug. 11, 2023, issued in corresponding CN Application No. 202080031451.5. Note: US 2016/0328326 A1, US 2013/0198541 A1, WO 2013/101123 A1, US 2008/0320236 A1, JP 2018-013843 A, US 2009/0013118 A1, US 2014/0143469 A1, and WO 2019/088746 A1 cited therein are already of record).

* cited by examiner

BATTERY MANAGEMENT APPARATUS AND METHOD

TECHNICAL FIELD

The present application claims priority to Korean Patent Application No. 10-2019-0116253 filed on Sep. 20, 2019 in the Republic of Korea, the disclosures of which are incorporated herein by reference.

The present disclosure relates to a battery management apparatus and method, and more particularly to a battery management apparatus having multiple cores and a battery management method using the same.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

A battery management system (BMS) is being actively developed to estimate and manage a state of a battery cell. In general, a single core is included in the BMS, but in order to improve performance, it is needed to develop a BMS with multiple cores.

Meanwhile, as the conventional art, an invention for preventing data inconsistency in a multi-core environment is disclosed (Patent Document 1).

Here, data inconsistency refers to a case where data stored in a cache memory included in a plurality of cores and data stored in a main memory are inconsistent with each other. For example, data inconsistency may refer to a case where 0x02 data is stored in the main memory and a first cache memory of a first core, but 0x01 data is stored in a second cache memory of a second core. As a result, a case where data in the same area of the main memory among the data stored in the first cache memory and the second cache memory are different from each other may occur.

Patent Document 1 relates to a sharing virtual memory management device for ensuring cache consistency. In particular, in Patent Document 1, if a plurality of cores access a virtual memory page simultaneously, a physical memory page is allocated to process data, and then only modified data is updated to the original physical memory page to guarantee cache consistency.

However, in Patent Document 1, when a plurality of cores access a virtual memory page simultaneously, a physical memory page is allocated, so a lot of system resources are required for allocating the physical memory page. Therefore, it is difficult to this technique in a battery pack or vehicle having a battery cell.

In addition, Patent Document 1 has a problem in that a lot of time is taken to process data because data is processed in a physical memory page and then the processed data is updated again. Therefore, it is difficult to apply this technique in an environment that demands rapid data processing, such as a situation where a vehicle equipped with a battery cell is running.

(Patent Document 1) KR 10-1355105 B1

DISCLOSURE

Technical Problem

The present disclosure is designed to solve the problems of the related art, and therefore the present disclosure is directed to providing a battery management apparatus and method, which may manage a state of a battery cell more accurately and reliably by preventing data inconsistency even in a multi-core environment.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery management apparatus for preventing data inconsistency in a multi-core environment, comprising: a processor including a plurality of cores respectively provided with a cache memory and configured to set a core storing a record-target data in the cache memory thereof among the plurality of cores as a main core and set a core other than the main core among the plurality of cores as a sub core; and a main memory configured to store the record-target data by the main core.

The main core may be configured to block an authority of the sub core to access the main memory while the record-target data is being recorded in the main memory, and endow an authority to access the main memory to the sub core after the record-target data is recorded in the main memory.

The processor may be configured to set the main core and the sub core, when a record request for recording the record-target data in the main memory is input from the core storing the record-target data in the cache memory thereof.

The sub core may be configured to delete the data stored in the cache memory provided to the sub core, when the authority to access the main memory is blocked.

The sub core may be configured to delete data corresponding to the record-target data among the data stored in the cache memory provided to the sub core, when the authority to access the main memory is blocked.

The processor may be configured to initialize setting for the main core and the sub core, after the authority to access the main memory is endowed to the sub core.

The processor may be configured to receive measurement data about at least one of current, voltage and temperature of a battery cell.

The plurality of cores may be configured to estimate at least one of SOC (State Of Charge) and SOH (State of Health) of the battery cell based on the measurement data received by the processor.

The record-target data may be configured to include the measurement data, and at least one of the SOC and the SOH of the battery cell estimated by the main core.

A battery pack according to another embodiment of the present disclosure may comprise the battery management apparatus according to an embodiment of the present disclosure.

A vehicle according to still another embodiment of the present disclosure may comprise the battery management apparatus according to an embodiment of the present disclosure.

A battery management method according to still another embodiment of the present disclosure comprises: a main core setting step of setting a core for recording a record-target data stored in a cache memory thereof in a main memory among a plurality of cores as a main core; an access authority blocking step of blocking an authority of a sub core, which is other than the main core among the plurality of cores, to access the main memory, while the main core is recording the record-target data in the main memory; and an access authority endowing step of endowing an authority to access the main memory to the sub core, after the record-target data is recorded in the main memory.

The battery management method according to still another embodiment of the present disclosure may further comprise, after the access authority blocking step, a cache memory initializing step of deleting data stored in the cache memory of the sub core.

Advantageous Effects

According to the subject invention, there is an advantage in that data inconsistency may be prevented even in a multi-core environment.

In addition, according to the subject invention, since the main core and the sub core may be set flexibly, there is an advantage in that the state of the battery cell may be more efficiently managed just with minimal system resources without allocating a separate memory.

The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise. Furthermore, the term "processor" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
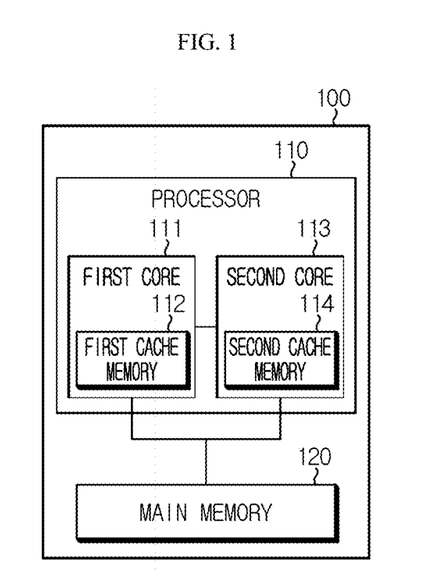
FIG. 1 is a diagram schematically showing a battery management apparatus according to an embodiment of the present disclosure.

FIG. 1 is a diagram schematically showing a battery management apparatus 100 according to an embodiment of the present disclosure.

Referring to FIG. 1, the battery management apparatus 100 according to an embodiment of the present disclosure may include a processor 110 and a main memory 120. Specifically, the battery management apparatus 100 according to an embodiment of the present disclosure may be used for preventing data inconsistency in a multi-core environment having a plurality of cores.

That is, the processor 110 may include a plurality of cores without any limitation on the number of cores. However, hereinafter, for convenience of description, it will be described that only a first core 111 and a second core 113 are included in the processor 110.

The processor 110 may include a plurality of cores respectively provided with a cache memory. That is, each of the plurality of cores provided in the processor 110 may include a cache memory. Thus, the plurality of cores may independently perform various operations.

Here, the cache memory is a storage device that temporarily copies and stores a part of contents stored in the main memory 120. For example, the cache memory may be an L1 cache memory provided in the processor 110. That is, each of the plurality of cores may include the L1 cache memory.

For example, in the embodiment of FIG. 1, the processor 110 may include the first core 111 and the second core 113. In addition, each of the first core 111 and the second core 113 may include a cache memory. That is, the first core 111 may include a first cache memory 112, and the second core 113 may include a second cache memory 114. If record-target data is stored in the first cache memory 112, the processor 110 may set the first core 111 as a main core.

The processor 110 may be configured to set a core storing record-target data in the cache memory thereof among the plurality of cores as a main core.

Specifically, the processor 110 may identify a cache memory in which record-target data is stored, among the cache memories respectively provided to the plurality of cores. In addition, the processor 110 may set a core having a cache memory identified as storing the record-target data as a main core.

In addition, the processor 110 may be configured to set a core other than the main core among the plurality of cores as a sub core.

For example, if the first core 111 is set as the main core as in the above embodiment, the processor 110 may set the second core 113 as a sub core.

That is, the main core and the sub core may be set depending on whether the record-target data is provided in the cache memory. For example, when the record-target data is stored in the second cache memory 114, the second core 113 may be set as a main core, and the first core 111 may be set as a sub core.

The main memory 120 may be configured to store the record-target data by the main core.

Here, the main memory 120 may store data or programs necessary for operation and function of each component of the battery management apparatus 100 according to an embodiment of the present disclosure, data generated in the process of performing the operation or function, or the like. The main memory 120 is not particularly limited in its kind as long as it is a known information storage means that can record, erase, update and read data. As an example, the main memory 120 may include RAM, flash memory, ROM, EEPROM, registers, and the like. Preferably, the main memory 120 may be a non-volatile memory whose memory resources are shared by the plurality of cores included in the processor 110.

Each of the plurality of cores has an authority to access the main memory 120. That is, each of the plurality of cores has read permission and write permission for the main memory 120. Accordingly, each of the plurality of cores may store the data stored in the cache memory in the main memory 120. In addition, each of the plurality of cores may load the data stored in the main memory 120.

Preferably, each of the plurality of cores may store the record-target data stored in the provided cache memory in the main memory 120. Here, storing data means not only storing new data in the main memory 120 but also updating data stored in advance in the main memory 120.

For example, it is assumed that A data is stored in advance in the main memory 120, and AA data is stored as the record-target data in the first cache memory 112 of the first core 111. Here, the AA data may be derived data obtained by modifying the A data by the first core 111. The first core 111 may overwrite the A data stored in the main memory 120 with the AA data stored in the first cache memory 112. That is, the A data stored in the main memory 120 may be updated with the AA data stored in the first cache memory 112.

The main core may block the authority of the sub core to access the main memory 120 while recording the record-target data in the main memory 120. That is, while the record-target data is being stored in the main memory 120, the sub core may temporarily lose the authority to access the main memory 120.

Each of the plurality of cores may be configured to transmit an interrupt to cores other than itself. In other words, the main core may transmit a first interrupt to at least one sub core. From the point when the main core sends the first interrupt, the sub core may lose the authority to access the main memory 120. Therefore, the sub core may not record data in the main memory 120 or read data from the main memory 120 from the time when the first interrupt is transmitted.

For example, the main core may be configured to block the write permission among the authority of the sub core to access the main memory 120, immediately after transmitting the first interrupt to the sub core. In this case, while the main core is recording the record-target data in the main memory 120, it is possible to prevent duplicate recording, namely prevent the sub core from recording the data to the main memory 120 in duplicate.

Also, the main core may be configured to block the read permission among the authority of the sub core to access the main memory 120, immediately after transmitting the first interrupt to the sub core. In this case, while the main core is recording the record-target data in the main memory 120, the sub core may not load the data stored in the main memory 120. Thus, data inconsistency among the main core, the sub core and the main memory 120 may be prevented.

The main core may be configured to endow the authority to access the main memory 120 to the sub core, after the record-target data is recorded in the main memory 120.

For example, the main core may transmit a second interrupt to the sub core after recording the record-target data stored in the cache memory in the main memory 120. From the point when the main core transmits the second interrupt, the sub core may be endowed with the authority to access the main memory 120 again.

That is, only while the record-target data stored in the cache memory of the main core is being stored in the main memory 120, the authority of the sub core to access the main memory 120 may be blocked. Accordingly, the battery management apparatus 100 may prevent data inconsistency by adjusting the access authority so that the plurality of cores cannot access the main memory 120 at the same time. Accordingly, there is an advantage in that the system stability of the battery management apparatus 100 may be improved.

In addition, according to the subject invention, without allocating a separate memory to prevent data inconsistency, the access authority is set flexibly, so that the state of a battery cell 10 may be managed more efficiently just with minimal system resources.

The processor 110 may be configured to set the main core and the sub core, if a record request to record the record-target data in the main memory 120 is input from a core where the record-target data is stored in the cache memory.

For example, each of the plurality of cores may generate new data in the cache memory or modify the existing data. In addition, each of the plurality of cores may transmit a record request to the processor 110 to record the data stored in the cache memory in the main memory 120, if data processing in the cache memory is completed. Here, the record-target data means data that is a target of the record request.

If receiving the record request from any one of the plurality of cores, the processor 110 may set the core transmitting the record request as a main core. In addition, the processor 110 may set a core other than the main core among the plurality of cores as a sub core.

Here, the main core and the sub core are not set according to type, specification or location in the processor 110, but may be set according to whether the record-target data stored in the cache memory is to be stored in the main memory 120. Preferably, the main core and the sub core may be set depending on whether record-target data to be recorded in the main memory 120 is stored therein. More preferably, the main core and the sub core may be set according to whether the record request to store the record-target data stored in the cache memory in the main memory 120 is transmitted to the processor 110.

Therefore, the battery management apparatus 100 has an advantage of flexibly setting the main core and the sub core. That is, in some cases, each of the plurality of cores may be set as a main core, so a process of recording the record-target data in the main memory 120 may be simplified. Also, the writing time for recording the record-target data in the main memory 120 may be shortened. In addition, there is an advantage that data inconsistency may be prevented while the record-target data stored in the main core is being recorded in the main memory 120.

The sub core may be configured to delete the data stored in the cache memory provided to the sub core if the authority to access the main memory 120 is blocked.

Most cache memories are capable of loading data from the main memory 120 and reading or modifying the loaded data. Thus, while the record-target data stored in the main core is being stored in the main memory 120, the cache memory stored in the sub core may be initialized to prevent data inconsistency.

For example, in the embodiment of FIG. 1, it is assumed that the first core 111 is set as a main core and the second core 113 is set as a sub core. If the processor 110 receives the record request to store the record-target data stored in the first cache memory 112 in the main memory 120 from the first core 111, it is possible to set the first core 111 as a main core and set the second core 113 as a sub core. The second core 113 set as a sub core may lose the authority to access the main memory 120 and delete the data stored in the second cache memory 114.

A series of processes of storing the record-target data stored in the first core 111 in the main memory 120 will be described in more detail with reference to FIG. 2.

Figure 2:
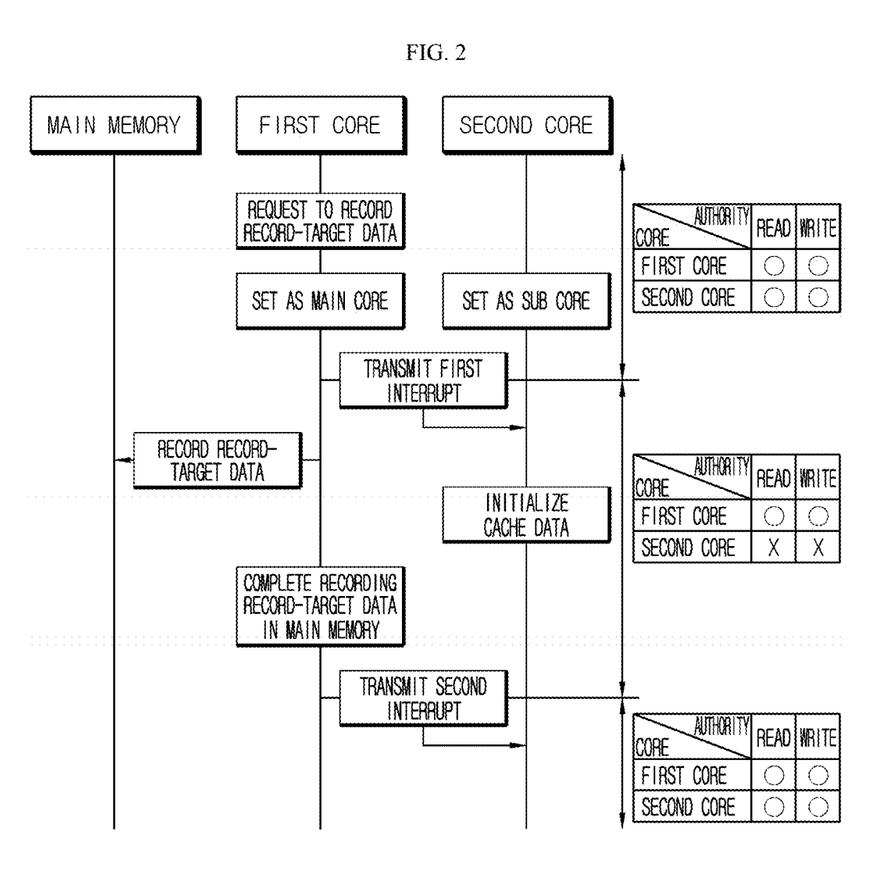
FIG. 2 is a diagram schematically showing an operating process of the battery management apparatus according to an embodiment of the present disclosure.

FIG. 2 is a diagram schematically showing an operating process of the battery management apparatus 100 according to an embodiment of the present disclosure.

Specifically, FIG. 2 is a diagram schematically showing an operating process in which the record-target data stored in the first cache memory 112 is stored in the main memory 120 according to time.

First, the first core 111 may transmit the record request to record the record-target data stored in the first cache memory 112 in the main memory 120 to the processor 110. If receiving the record request, the processor 110 may set the first core 111 transmitting the record request as a main core and set the second core 113 as a sub core.

The first core 111 set as a main core may transmit the first interrupt to the second core 113. In other words, from the time when transmitting the first interrupt, the first core 111 may block the authority of the second core 113 to access the main memory 120.

In addition, the first core 111 may record the record-target data stored in the first cache memory 112 in the main memory 120.

While the record-target data is being recorded in the main memory 120, the second core 113 may delete all data stored in the second cache memory 114. Preferably, if the second core 113 receives the first interrupt, the second core 113 may initialize the second cache memory 114. Therefore, there is no room for data inconsistency to occur in the first core 111, the second core 113 and the main memory 120.

After recording the record-target data in the main memory 120, the first core 111 may transmit the second interrupt to the second core 113. In other words, from the time when transmitting the second interrupt, the first core 111 may endow the authority to access the main memory 120 to the second core 113.

Hereinafter, a case in which data inconsistency occurs when the read permission or the write permission of the second core 113 is not blocked will be described in more detail with reference to FIG. 2.

For example, it is assumed that the record-target data stored in the cache memory of the first core 111 is 0x11111, the data stored in the cache memory of the second core 113 is 0x10101, and the data stored in the main memory 120 is 0x00000. After transmitting the first interrupt to the second core 113, the first core 111 may record the record-target data (0x11111) in the main memory 120.

In addition, hereinafter, it is assumed that when data is recorded, the data is recorded from the MSB (Most Significant Bit). That is, the record-target data (0x11111) may be stored in the main memory 120 in the order of 0x10000, 0x11000, 0x11100, 0x11110, and 0x11111.

<Data inconsistency when the read permission is not blocked>

As in the former embodiment, it is assumed that the record-target data stored in the cache memory of the first core 111 is 0x11111, the data stored in the cache memory of the second core 113 is 0x10101, and the data stored in the main memory 120 is 0x00000.

If the read permission of the second core 113 is not blocked while the record-target data (0x11111) is being stored in the main memory 120, data inconsistency may occur.

Specifically, after the second cache memory 114 of the second core 113 is initialized, data inconsistency may occur if the second core 113 accesses the main memory 120 and loads data while the record-target data is being recorded in the main memory 120.

For example, if the second core 113 having the read permission loads the data stored in the main memory 120 at the moment when 0x11100 is recorded in the main memory 120, 0x11100 may be stored in the second cache memory 114. After the record-target data is completely recorded by the first core 111, 0x11111 may be stored in the first cache memory 112 and the main memory 120, but 0x11100 may be stored in the second cache memory 114. Therefore, in this case, data inconsistency may occur because the read permission of the second core 113 is not blocked.

<Data Inconsistency when the Write Permission is not Blocked>

If the data stored in the second cache memory 114 is recorded in the main memory 120 before the second core 113 deletes the data stored in the second cache memory 114, data inconsistency may occur due to duplicated data recording.

Specifically, if the second core 113 records the data stored in the second cache memory 114 in the main memory 120 after the first core 111 records the record-target data in the main memory 120, data inconsistency may occur.

For example, as in the former embodiment, it is assumed that the record-target data stored in the cache memory of the first core 111 is 0x11111, the data stored in the cache memory of the second core 113 is 0x10101, and the data stored in the main memory 120 is 0x00000.

After the first core 111 records 0x11111 stored in the first cache memory 112 in the main memory 120, the second core 113 may record 0x10101 stored in the second cache memory 114 in the main memory 120. After that, the second cache memory 114 may be initialized.

In this case, 0x11111 may be stored in the first cache memory 112, 0x10101 may be stored in the main memory 120, and the second cache memory 114 may be initialized. Therefore, when the write permission of the second core 113 is not blocked, data inconsistency may occur.

That is, the battery management apparatus 100 according to an embodiment of the present disclosure has an advantage of reliably preventing data inconsistency in a multi-core environment by blocking the authority of the sub core to access the main memory 120 and initializing the cache memory of the sub core when the record-target data stored in the main core is stored in the main memory 120.

The sub core may be configured to delete data corresponding to the record-target data among the data stored in the cache memory provided to the sub core, if the authority to access the main memory 120 is blocked.

For example, in the embodiment of FIG. 1, it is assumed that A data is stored in the first cache memory 112, and AA data and B data are stored in the second cache memory 114. Here, the AA data may be data corresponding to the A data, and the B data may be data not corresponding to the A data. That is, the AA data may be data derived from the A data.

The first core 111 may be set as a main core and the second core 113 may be set as a sub core by the processor 110. In addition, the first core 111 may transmit a first interrupt to the second core 113 before recording the A data, which is the record-target data, in the main memory 120. At this time, the first core 111 may transmit the first interrupt and A data information to the second core 113 together. Upon receiving the first interrupt and the A data information, the second core 113 may delete the AA data corresponding to the A data among the data stored in the second cache memory 114.

That is, among the data stored in the second cache memory 114, the B data may not be deleted. In this case, the work of the second core 113 for the B data may be continued independently of recording the A data, which is the record-target data, in the main memory 120. After the A data is recorded in the main memory 120, the second core 113 may request the processor 110 to record the B data. The processor 110 may set the second core 113, which has requested to record the B data, as a main core. As a result, since the B data is continuously stored in the second cache memory 114 regardless of whether the A data is recorded in the main memory 120, the total time for recording the A data and the B data in the main memory 120 may be shortened.

Therefore, the battery management apparatus 100 according to an embodiment of the present disclosure has an advantage of improving the working efficiency of the processor 110 by selectively deleting only data that has possibility of causing data inconsistency among the data stored in the sub core.

The processor 110 may be configured to initialize settings for the main core and the sub core after the authority to access the main memory 120 is endowed to the sub core.

Specifically, if the main core records the record-target data in the main memory 120 and transmits the second interrupt to the sub core, the processor 110 may initialize the settings for the main core and the sub core.

That is, the main core and the sub core are not set based on the specifications, types or structural characteristics of the core, but may be set flexibly depending on whether the record-target data to be recorded in the main memory 120 is stored.

If it is assumed that the main core and the sub core are fixedly set, only the main core may transmit the interrupt to the sub core, so there is a problem in that the record-target data stored in the sub core cannot be efficiently recorded in the main memory 120. For example, the sub core may have to store the data stored in the cache memory of the sub core in the main memory 120 through the main core.

Therefore, the battery management according to an embodiment of the present disclosure has an advantage of flexibly setting the main core capable of transmitting an interrupt to another core depending on whether the record-target data is stored.

Figure 3:
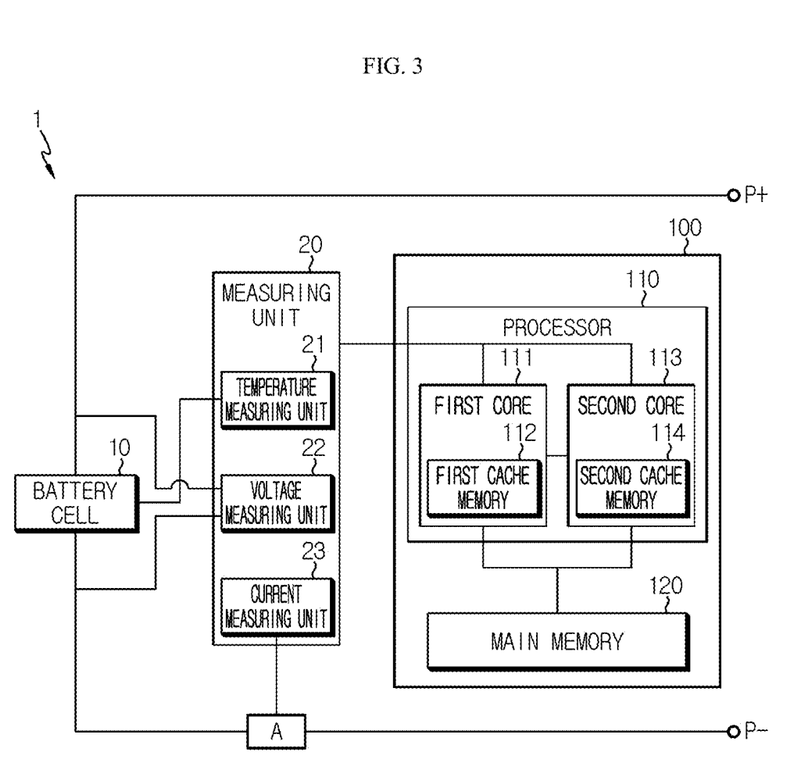
FIG. 3 is a diagram schematically showing a battery pack including the battery management apparatus according to an embodiment of the present disclosure.

FIG. 3 is a diagram schematically showing a battery pack 1 including the battery management apparatus 100 according to an embodiment of the present disclosure.

Referring to FIG. 3, the battery pack 1 may include a battery cell 10, a measuring module 20, and the battery management apparatus 100. That is, the battery management apparatus 100 according to an embodiment of the present disclosure may be provided in the battery pack 1.

The battery pack 1 may include one battery cell 10, or may include a battery module in which a plurality of battery cells 10 are connected in series and/or in parallel. Hereinafter, for convenience of description, it will be described that one battery cell 10 is included in the battery pack 1.

The measuring module 20 may be configured to measure at least one of temperature, voltage and current of the battery cell 10. Specifically, the measuring module 20 may selectively include at least one of a temperature measuring unit 21, a voltage measuring unit 22 and a current measuring unit 23.

The temperature measuring unit 21 is a general temperature sensor and may be configured to measure the temperature of the battery cell 10.

The voltage measuring unit 22 may measure the voltage of the battery cell 10 by measuring a positive electrode potential and a negative electrode potential of the battery cell 10 and then calculating a difference between the measured positive electrode potential and the measured negative electrode potential. Specifically, the voltage measuring unit 22 may measure the positive electrode potential of the battery cell 10 through a sensing line connected to a positive electrode terminal of the battery cell 10. In addition, the voltage measuring unit 22 may measure the negative electrode potential of the battery cell 10 through a sensing line connected to the negative electrode terminal of the battery cell 10.

The current measuring unit 23 may measure a charging or discharging current of the battery cell 10 through a current meter A provided on a charging/discharging path of the battery cell 10.

The processor 110 may be configured to receive measurement data for at least one of current, voltage and temperature of the battery cell 10.

The processor 110 may be connected to the measuring module 20 via a line. In addition, the processor 110 may be configured to receive at least one of current data, voltage data and temperature data of the battery cell 10 from the measuring module 20 through the connected line.

In addition, as shown in FIG. 3, the line connecting the processor 110 and the measuring module 20 may be connected to each of the first core 111 and the second core 113. Accordingly, the measurement data received by the processor 110 from the measuring module 20 may be input to the first core 111 and the second core 113, respectively. In addition, the measurement data may be stored in the first cache memory 112 and the second cache memory 114, respectively.

The plurality of cores may be configured to estimate at least one of SOC (State of Charge) and SOH (State of Health) of the battery cell 10 based on the measurement data received by the processor 110.

In the embodiment of FIG. 3, the first core 111 may estimate at least one of SOC and SOH of the battery cell 10 based on the measurement data stored in the first cache memory 112. In addition, the second core 113 may estimate at least one of SOC and SOH of the battery cell 10 based on the measurement data stored in the second cache memory 114, separate from the first core 111.

For example, each of the plurality of cores may estimate the SOC of the battery cell 10 based on the voltage data measured by the measuring module 20. The main memory 120 may store a voltage-SOC look-up table in which the voltage and SOC of the battery cell 10 are mapped. Accordingly, the plurality of cores may estimate the SOC of the battery cell 10 by referring to the voltage-SOC look-up table stored in the main memory 120.

Preferably, each of the plurality of cores may estimate the SOC of the battery cell 10 based on the voltage data and the temperature data measured by the measuring module 20. The main memory 120 may store a temperature-voltage-SOC look-up table in which voltage and SOC of the battery cell 10 are mapped according to the temperature of the battery cell 10. Accordingly, the plurality of cores may estimate the SOC of the battery cell 10 by referring to the temperature-voltage-SOC look-up table stored in the main memory 120. The SOC of the battery cell 10 has a one-to-one relationship with the voltage of the battery cell 10, but is also affected by the temperature of the battery cell 10. Therefore, since the SOC of the battery cell 10 may be estimated even in consideration of the temperature of the battery cell 10, the state of the battery cell 10 may be more accurately estimated.

In addition, each of the plurality of cores may estimate the SOC of the battery cell 10 based on the current data measured by the measuring module 20. In this case, each of the plurality of cores may estimate the SOC of the battery cell 10 by integrating current data measured during the charging or discharging time of the battery cell 10.

In addition, each of the plurality of cores may estimate the SOH of the battery cell 10 by calculating an internal resistance of the battery cell 10 based on the voltage data and the current data measured by the measuring module 20 and comparing the calculated internal resistance with an initial resistance of the battery cell 10. At this time, the data on the initial resistance of the battery cell 10 may be stored in advance in the main memory 120.

In addition, each of the plurality of cores may estimate the SOC and/or SOH of the battery cell 10 using at least one of voltage data, current data and temperature data measured by the measuring module 20.

In addition, as described above with reference to FIGS. 1 and 2, the first core 111 and the second core 113 may record the data stored in the cache memory in the main memory 120.

Accordingly, the battery management apparatus 100 according to an embodiment of the present disclosure may prevent data inconsistency with respect to the state information of the battery cell 10 in a multi-core environment. Therefore, there is an advantage in that the accuracy and reliability of information on the state of the battery cell 10 may be greatly improved. In addition, since the above operation is basically performed in a multi-core environment, there is an advantage in that the state of the battery cell 10 may be estimated quickly and the time for estimating the state of the battery cell 10 may be greatly reduced.

Preferably, the record-target data may be configured to include the measurement data and at least one of the SOC and SOH of the battery cell 10 estimated by the main core.

As described above, the main core and the sub core may be set flexibly depending on whether the record-target data to be recorded in the main memory 120 is stored. In addition, the measurement data measured by the measuring module 20 may be input to both the first core 111 and the second core 113. In addition, the first core 111 and the second core 113 may estimate SOC and SOH of the battery cell 10, respectively, based on the input measurement data.

The main core capable of recording data in the main memory 120 may be a core that requests the processor 110 to record the data stored in the cache memory. That is, the record-target data that may be recorded in the main memory 120 is inevitably the record-target data stored in the cache memory of the main core.

Therefore, the main core may use not only the measurement data input from the measuring module 20 but also the directly estimated SOC and/or SOH of the battery cell 10 as the record-target data. In addition, the main core may record the record-target data in the main memory 120.

While the main core is recording the record-target data in the main memory 120, the cache memory of the sub core is initialized, so there is no room for data inconsistency to occur for the battery cell 10.

For example, it is assumed that both the first core 111 and the second core 113 receive the voltage data, current data and temperature data measured by the measuring module 20. The first core 111 and the second core 113 may estimate SOC and SOH of the battery cell 10 based on the received data, respectively.

After completely estimating SOC and SOH of the battery cell 10, the first core 111 may request the processor 110 to record the estimated SOC and SOH of the battery cell 10. After that, the first core 111 may be set as a main core, and the second core 113 may be set as a sub core. The first core 111 may block the authority of the second core 113 to access the main memory 120 by transmitting the first interrupt to the second core 113.

After that, when the SOC and SOH of the battery cell 10 estimated by the first core 111 are recorded in the main memory 120, the cache memory stored in the second core 113 may be initialized. That is, in this situation, the SOC and SOH of the battery cell 10 estimated by the first core 111 may be stored in the cache memory of the first core 111, and the cache memory of the second core 113 may be in an initialized state. Accordingly, data inconsistency between the first core 111 and the second core 113 may be prevented.

That is, since the battery management apparatus 100 according to an embodiment of the present disclosure may prevent data inconsistency in a multi-core environment, there is an advantage in that the state of the battery cell 10 may be more accurately estimated. Also, the reliability of the estimated state of the battery cell 10 may be increased.

Preferably, only data corresponding to the record-target data stored in the cache memory of the main core among the data stored in the cache memory of the sub core may be deleted.

For example, in the former embodiment, in order to quickly estimate the state of the battery cell 10, the first core 111 may estimate the SOC of the battery cell 10, and the second core 113 may estimate the SOH of the battery cell 10. In this case, the first core 111, which is a main core, may transmit the first interrupt and the estimated SOC information of the battery cell 10 together to the second core 113, which is a sub core. The second core 113 may receive the first interrupt and the SOC of the battery cell 10 estimated by the first core 111 and delete only the data corresponding to the SOC of the battery cell 10 among the data stored in the cache memory of the second core 113. At this time, the SOH of the battery cell 10 estimated by the second core 113 may not be deleted.

After the SOC of the battery cell 10 estimated by the first core 111 is recorded in the main memory 120, the SOH of the battery cell 10 estimated by the second core 113 may be recorded in the main memory 120. Of course, in this case, the processor 110 may set the second core 113 as a main core.

Therefore, the battery management apparatus 100 according to an embodiment of the subject invention has an advantage of preventing data inconsistency while greatly shortening data processing time by maximizing the advantage in the multi-core environment.

In addition, the battery management apparatus 100 according to an embodiment of the present disclosure may be provided to a vehicle. Specifically, the battery management apparatus 100 may be provided to a vehicle equipped with one or more battery cells 10. The battery management apparatus 100 may quickly estimate SOC and/or SOH of the battery cell 10 provided in the vehicle by using multiple cores. In addition, the battery management apparatus 100 may store and manage battery state information on the estimated SOC and/or SOH of the battery cell 10 in the main memory 120 while preventing data inconsistency. Preferably, the battery management apparatus 100 may be provided to the battery pack 1, and the battery pack 1 may be included in the vehicle.

Figure 4:
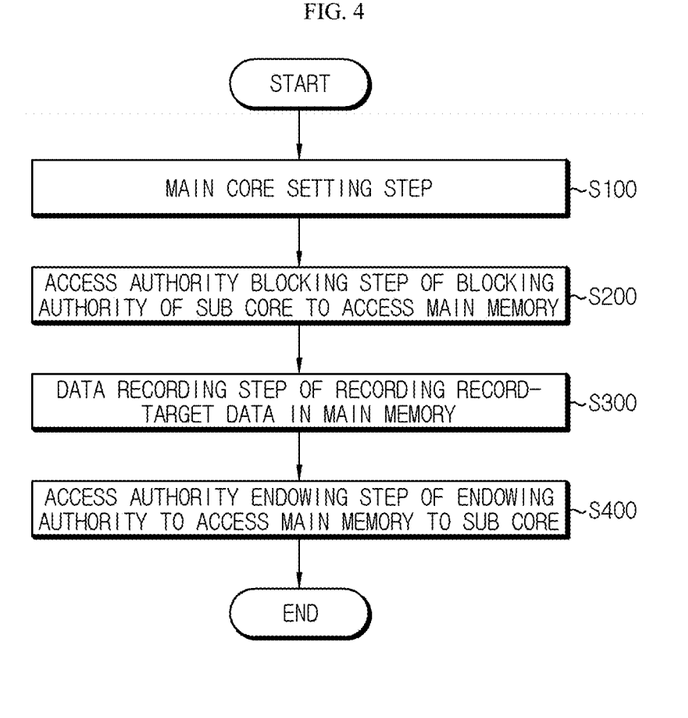
FIG. 4 is a diagram schematically showing a battery management method according to another embodiment of the present disclosure.

FIG. 4 is a diagram schematically showing a battery management method according to another embodiment of the present disclosure.

Referring to FIG. 4, the battery management method may include a main core setting step (S100), an access authority blocking step (S200), a data recording step (S300), and an access authority endowing step (S400). Here, each step of the battery management method may be performed by the battery management apparatus 100.

The main core setting step (S100) is a step of setting a core for recording record-target data stored in the provided cache memory in the main memory 120 among the plurality of cores as a main core, and may be performed by the processor 110.

For example, the record-target data may be at least one of temperature, voltage, current, SOC and SOH of the battery cell 10. A core storing the record-target data in the cache memory thereof among the plurality of cores included in the processor 110 may send a record request to the processor 110. Here, the record request may be a request to record the record-target data stored in the cache memory in the main memory 120.

If receiving the record request, the processor 110 may set the core transmitting the record request as a main core. In addition, the processor 110 may set all cores other than the main core among the plurality of cores as sub cores.

The access authority blocking step (S200) is a step of blocking the authority of the sub core, other than the main core among the plurality of cores, to access the main memory 120 while the main core is recording the record-target data in the main memory 120, and may be performed by the main core.

First, each of the plurality of cores included in the processor 110 may transmit the interrupt to other cores. Therefore, when the main core wants to store the record-target data in the main memory 120, the main core may block the authority of the sub core to access the main memory 120 by transmitting the first interrupt to the sub core.

Specifically, referring to FIG. 2, after the first core 111 set as a main core transmits the first interrupt to the second core 113 set as a sub core, the first core 111 may record the record-target data in the main memory 120. In this case, immediately after the first interrupt is transmitted, the second core 113 loses the read permission and the write permission for the main memory 120. Thus, while the first core 111 is recording the record-target data in the memory, the second core 113 is not able to access the main memory 120.

The access authority endowing step (S400) is a step of endowing the authority to access the main memory 120 to the sub core after the record-target data is recorded in the main memory 120, and may be performed by the main core.

Specifically, referring to FIG. 2, after all record-target data are recorded in the main memory 120, the first core 111 may transmit the second interrupt to the second core 113. In this case, immediately after the second interrupt is transmitted, the second core 113 recovers the read permission and the write permission for the main memory 120. Immediately after the second interrupt is transmitted, the second core 113 may access the main memory 120.

In a multi-core environment, the battery management method may flexibly set the authority of the sub core to access the main memory 120 in order to prevent data inconsistency caused by data duplication. Therefore, the system may be more stable since inconsistency of data recorded in the main memory 120 is prevented and system crash is reduced.

Figure 5:
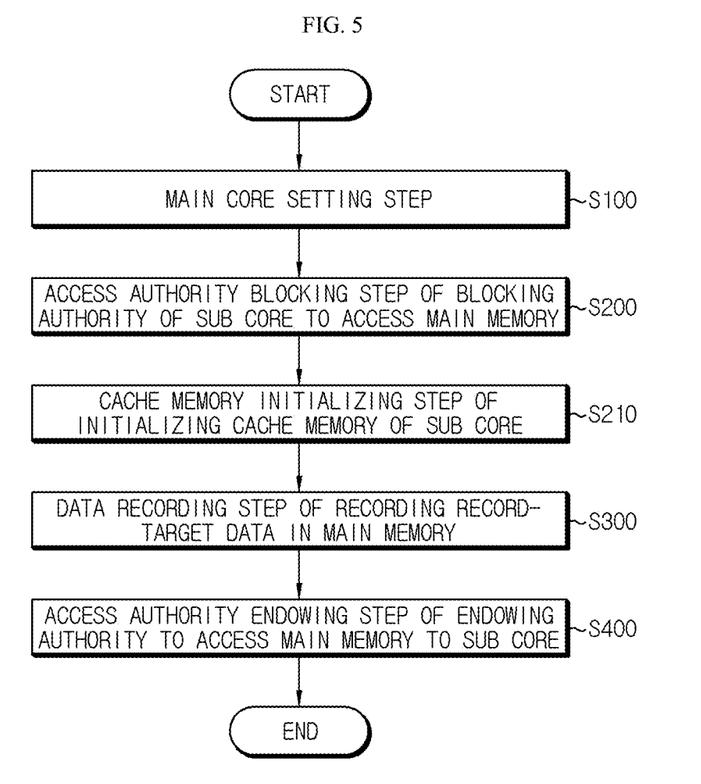
FIG. 5 is a diagram schematically showing a battery management method according to still another embodiment of the present disclosure.

FIG. 5 is a diagram schematically showing a battery management method according to still another embodiment of the present disclosure. Here, each step of the battery management method may be performed by the battery management apparatus 100.

The battery management method shown in FIG. 5 may further include a cache memory initializing step (S210) in the battery management method shown in FIG. 4.

Hereinafter, the cache memory initializing step (S210) added to FIG. 5 will be described, excluding parts described above with reference to FIG. 4.

The battery management method may further include the cache memory initializing step (S210) between the access authority blocking step (S200) and the data recording step (S300).

The cache memory initializing step (S210) is a step of deleting the data stored in the cache memory of the sub core, and may be performed by the sub core.

Referring to FIG. 2, the sub core may initialize the cache memory by deleting the data stored in the cache memory after receiving the first interrupt from the main core. In this case, since no data is stored in the cache memory of the sub core and the record-target data stored in the cache memory of the main core is recorded in the main memory 120, data inconsistency does not occur among the main core, the sub core and the main memory 120.

While the record-target data is being recorded in the main memory 120, since the sub core is not able to access the main memory 120, there is no room for the sub core to load the data being recorded from the main memory 120.

In addition, while the record-target data is being recorded in main memory 120, there is no room for system crash or data inconsistency to occur since the sub core is not able to record the data stored in the cache memory in the main memory 120. Also, after the cache memory of the sub core is initialized, data inconsistency does not occur because data capable of being stored in the main memory 120 is not present in the cache memory of the sub core.

As a result, since the sub core may be accessed after the record-target data is completely recorded in the main memory 120, data inconsistency may be prevented.

That is, the battery management method may prevent data inconsistency in a multi-core environment by initializing the cache memory of the sub core and blocking the authority of the sub core to access the main memory 120. In addition, since the above operation is performed in a multi-core environment, there is an advantage in that the accuracy and reliability of estimation may be remarkably improved while the state information of the battery cell 10 is estimated more quickly.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

1: battery pack
10: battery cell
20: measuring module
21: temperature measuring unit
22: voltage measuring unit
23: current measuring unit
100: battery management apparatus
110: processor
111: first core
112: first cache memory
113: second core
114: second cache memory
120: main memory
A: current meter

What is claimed is:

1. A battery management apparatus for preventing data inconsistency in a multi-core environment, comprising:
a processor including a plurality of cores, each respectively provided with a cache memory, the processor being configured to:
receive measurement data for at least one of current, voltage, and temperature of a battery cell;
set a core storing a record-target data in the cache memory thereof among the plurality of cores as a main core, the main core being configured to estimate at least one of a state of charge (SOC) and a state of health (SOH) of the battery cell based on the measurement data, and the record-target data including the at least one of the SOC and the SOH estimated by the main core; and
set a core other than the main core among the plurality of cores as a sub core; and
a main memory configured to store the record-target data from the main core,
wherein the main core is configured to:
transmit a first interrupt and the record-target data together to the sub core to block an authority of the sub core to access the main memory,
record the record-target data in the main memory after transmitting the first interrupt and the record-target data to the sub core, and
transmit a second interrupt to the sub core to endow an authority to access the main memory to the sub core after the record-target data is recorded in the main memory,
wherein the main core is configured to estimate one of the SOC and the SOH of the battery cell based on the measurement data,
wherein the record-target data is configured to include the one of the SOC and the SOH estimated by the main core, and
wherein the sub core is configured to estimate the other of the SOC and the SOH of the battery cell based on the measurement data.

2. The battery management apparatus according to claim 1, wherein the processor is further configured to set the main core and the sub core, when a record request for recording the record-target data in the main memory is input from the core storing the record-target data in the cache memory thereof.

3. The battery management apparatus according to claim 1, wherein the processor is further configured to initialize setting for the main core and the sub core, after the authority to access the main memory is endowed to the sub core.

4. The battery management apparatus according to claim 1, wherein the record-target data is configured to include the measurement data and the at least one of the SOC and the SOH of the battery cell estimated by the main core.

5. The battery management apparatus according to claim 1, wherein each of the plurality of cores has an authority to access the main memory prior to the main core transmitting the first interrupt.

6. The battery management apparatus according to claim 1, wherein the sub core has the authority to access the main memory prior to the main core transmitting the first interrupt.

7. The battery management apparatus according to claim 1,
wherein the sub core is configured to delete data corresponding to the record-target data, without deleting other data corresponding to the other of the SOC and the SOH, among the data stored in the cache memory provided to the sub core.

8. The battery management apparatus according to claim 1, wherein the sub core is configured to delete data stored in the cache memory provided to the sub core corresponding to the record-target data in response to receiving the first interrupt and the record-target data from the main core and before receiving the second interrupt from the main core.

9. The battery management apparatus according to claim 8, wherein the sub core is further configured to delete the data corresponding to the record-target data, without deleting other data, among the data stored in the cache memory provided to the sub core, in response to receiving the first interrupt and the record-target data from the main core.

10. A battery pack, comprising the battery management apparatus according to claim 1.

11. A vehicle, comprising the battery management apparatus according to claim 1.

12. A battery management method, comprising:
receiving measurement data for at least one of current, voltage, and temperature of a battery cell;
a main core setting operation of setting a core for recording a record-target data stored in a cache memory thereof in a main memory, among a plurality of cores of a processor, as a main core, the main core being configured to estimate at least one of a state of charge (SOC) and a state of health (SOH) of the battery cell based on the measurement data, and the record-target data including the at least one of the SOC and the SOH estimated by the main core;
an access authority blocking operation of blocking an authority of a sub core, which is other than the main core, among the plurality of cores, to access the main memory by transmitting a first interrupt and the record-target data together from the main core to the sub core;
recording the record-target data in the main memory after the first interrupt and record-target data are transmitted together from the main core to the sub core; and
an access authority endowing operation of endowing an authority to access the main memory to the sub core by transmitting a second interrupt from the main core to the sub core, after the record-target data is recorded in the main memory,
wherein the main core is configured to estimate one of the SOC and the SOH of the battery cell based on the measurement data,
wherein the record-target data is configured to include the one of the SOC and the SOH estimated by the main core, and
wherein the sub core is configured to estimate the other of the SOC and the SOH of the battery cell based on the measurement data.

13. The battery management method according to claim 12, wherein each of the plurality of cores has an authority to access the main memory prior to the access authority blocking operation.

14. The battery management method according to claim 12, wherein the sub core has the authority to access the main memory prior to the access authority blocking operation.

15. The battery management method according to claim 12, further comprising a cache memory initializing operation of deleting data corresponding to the record-target data, without deleting other data corresponding to the other of the SOC and the SOH, among data stored in a cache memory provided to the sub core.

16. The battery management method according to claim 12, further comprising, after the access authority blocking operation and before the recording of the record-target data in the main memory, a cache memory initializing operation of deleting data stored in the cache memory of the sub core corresponding to the record-target data in response to the first interrupt and the record-target data being received together by the sub core from the main core.

17. The battery management method according to claim 16, wherein the cache memory initializing operation includes deleting the data corresponding to the record-target data, without deleting other data, among the data stored in the cache memory provided to the sub core in response the first interrupt and the record-target data being received together by the sub core from the main core.

* * * * *